(12) United States Patent
Conklin et al.

(10) Patent No.: US 10,270,819 B2
(45) Date of Patent: Apr. 23, 2019

(54) SYSTEM AND METHOD PROVIDING COLLABORATIVE INTERACTION

(71) Applicant: Microsoft Technology Licensing, LLC, Redmond, WA (US)

(72) Inventors: Skji Martens Conklin, Seattle, WA (US); Philip Lindsley Davidson, Seattle, WA (US); Anne Archambault, Redmond, WA (US); Joo Young Lee, Redmond, WA (US); Jeff Berg, Seattle, WA (US); Peter Zuo, Kirkland, WA (US); Phil Rogan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 233 days.

(21) Appl. No.: 14/555,458

(22) Filed: Nov. 26, 2014

(65) Prior Publication Data

US 2015/0334139 A1     Nov. 19, 2015

Related U.S. Application Data

(60) Provisional application No. 61/996,781, filed on May 14, 2014.

(51) Int. Cl.
*G06F 3/048* (2013.01)
*H04L 29/06* (2006.01)
(Continued)

(52) U.S. Cl.
CPC .............. *H04L 65/403* (2013.01); *G06F 3/03* (2013.01); *G06F 3/0482* (2013.01);
(Continued)

(58) Field of Classification Search
CPC ....................................................... G06F 3/0488
See application file for complete search history.

(56) References Cited

U.S. PATENT DOCUMENTS 5,790,114 A    8/1998 Geaghan et al.
6,038,295 A    3/2000 Mattes
(Continued)

FOREIGN PATENT DOCUMENTS

CN    101567798 A    10/2009
CN    102209961 A    10/2011
(Continued)

OTHER PUBLICATIONS

IMS Global Learning Consortium, Inc., "IMS GLC IWB/CFF Specification," Version 1.0 Final Specification, Available Online at https://www.imsglobal.org/specificationdownload.cfm, Feb. 1, 2012, 44 pages.
(Continued)

*Primary Examiner* — Pei Yong Weng
(74) *Attorney, Agent, or Firm* — Alleman Hall Creasman & Tuttle LLP

(57) ABSTRACT

A method for providing collaborative interaction between a receiver computing device and a sender computing device is provided. The method includes at the receiver computing device, establishing a local peer-to-peer wireless connection with a sender computing device, receiving from the sender computing device via the local peer-to-peer wireless connection data for a GUI of a remotely executed application program that is executed on the sender computing device, displaying the GUI on a display associated with the receiver computing device, receiving user input from an input device associated with the receiver computing device indicating a user interaction with the GUI, sending the user input to the sender computing device, receiving from the sender computing device data indicating an updated state of the GUI
(Continued)

generated by the sender computing device based on the user input, and displaying the updated state of the GUI on the display associated with the receiver computing device.

21 Claims, 7 Drawing Sheets

(51) Int. Cl.
    *H04L 29/08*     (2006.01)
    *G06F 3/0484*     (2013.01)
    *G06F 3/0488*     (2013.01)
    *G06F 3/0482*     (2013.01)
    *G06F 9/451*     (2018.01)
    *G06F 3/14*     (2006.01)
    *G06F 3/03*     (2006.01)
    *G06Q 10/10*     (2012.01)

(52) U.S. Cl.
    CPC ........ *G06F 3/0488* (2013.01); *G06F 3/04842* (2013.01); *G06F 3/1454* (2013.01); *G06F 9/452* (2018.02); *G06Q 10/101* (2013.01); *H04L 67/104* (2013.01)

(56) References Cited

U.S. PATENT DOCUMENTS

| | | | |
|---|---|---|---|
| 6,108,444 A | 8/2000 | Syeda-Mahmood | |
| 6,256,028 B1 | 7/2001 | Sanford et al. | |
| 6,501,463 B1 | 12/2002 | Dahley et al. | |
| 6,781,611 B1 | 8/2004 | Richard | |
| 6,952,803 B1 | 10/2005 | Bloomberg et al. | |
| 7,039,234 B2 | 5/2006 | Geidl et al. | |
| 7,043,529 B1 | 5/2006 | Simonoff | |
| 7,409,089 B2 | 8/2008 | Simmons et al. | |
| 7,508,354 B1 | 3/2009 | Sanders et al. | |
| 7,587,675 B2 * | 9/2009 | Cunningham | H04L 41/22 370/254 |
| 7,725,527 B2 | 5/2010 | Janssen et al. | |
| 7,823,077 B2 | 10/2010 | Kurtz et al. | |
| 7,925,987 B2 | 4/2011 | Gounares et al. | |
| 7,961,943 B1 | 6/2011 | Zeevi | |
| 8,166,388 B2 | 4/2012 | Gounares et al. | |
| 8,244,233 B2 | 8/2012 | Chang et al. | |
| 8,254,704 B2 | 8/2012 | Lu et al. | |
| 8,271,887 B2 | 9/2012 | Offer et al. | |
| 8,334,902 B2 | 12/2012 | Golovchinsky et al. | |
| 8,593,502 B2 | 11/2013 | Saleh et al. | |
| 8,594,467 B2 | 11/2013 | Lu et al. | |
| 8,635,531 B2 | 1/2014 | Graham et al. | |
| 8,682,973 B2 | 3/2014 | Kikin-Gil et al. | |
| 8,745,018 B1 | 6/2014 | Singleton et al. | |
| 8,751,534 B2 | 6/2014 | Kawano et al. | |
| 9,319,356 B2 | 4/2016 | Odell et al. | |
| 2002/0113773 A1 | 8/2002 | McDonnell et al. | |
| 2004/0122873 A1 | 6/2004 | Wright, Jr. et al. | |
| 2004/0128354 A1 | 7/2004 | Horikiri et al. | |
| 2004/0196313 A1 | 10/2004 | Wynn et al. | |
| 2004/0240404 A1 * | 12/2004 | Ibrahim | H04L 1/1642 370/312 |
| 2005/0091302 A1 | 4/2005 | Soin et al. | |
| 2005/0238156 A1 | 10/2005 | Turner | |
| 2007/0174429 A1 | 7/2007 | Mazzaferri et al. | |
| 2007/0216660 A1 | 9/2007 | Sposato et al. | |
| 2007/0296997 A1 | 12/2007 | Taneda | |
| 2008/0086370 A1 | 4/2008 | Narayanaswami et al. | |
| 2008/0170789 A1 | 7/2008 | Thacker | |
| 2008/0174568 A1 | 7/2008 | Kim | |
| 2008/0232690 A1 | 9/2008 | Saund et al. | |
| 2008/0248834 A1 | 10/2008 | Chatterjee et al. | |
| 2009/0007009 A1 | 1/2009 | Luneau et al. | |
| 2009/0119604 A1 | 5/2009 | Simard et al. | |
| 2009/0147958 A1 | 6/2009 | Calcaterra et al. | |
| 2009/0244278 A1 | 10/2009 | Taneja et al. | |
| 2010/0060549 A1 | 3/2010 | Tsern | |
| 2010/0064228 A1 * | 3/2010 | Tsern | G06F 3/1415 715/740 |
| 2010/0171754 A1 | 7/2010 | Hatfield et al. | |
| 2010/0201891 A1 | 8/2010 | Laroia et al. | |
| 2010/0250497 A1 | 9/2010 | Redlich et al. | |
| 2010/0261507 A1 | 10/2010 | Chang et al. | |
| 2010/0262673 A1 * | 10/2010 | Chang | G06F 3/1454 709/217 |
| 2010/0302141 A1 | 12/2010 | Shankar et al. | |
| 2010/0332563 A1 | 12/2010 | Fujikawa | |
| 2011/0083109 A1 | 4/2011 | Hildebrandt et al. | |
| 2011/0138314 A1 | 6/2011 | Mir et al. | |
| 2011/0179352 A1 | 7/2011 | Treadwell et al. | |
| 2011/0246875 A1 | 10/2011 | Parker et al. | |
| 2011/0265034 A1 | 10/2011 | Garin et al. | |
| 2012/0124484 A1 | 5/2012 | Robinson et al. | |
| 2012/0204093 A1 | 8/2012 | Habarakada et al. | |
| 2012/0226742 A1 | 9/2012 | Momchilov et al. | |
| 2012/0229425 A1 | 9/2012 | Barrus et al. | |
| 2012/0233615 A1 | 9/2012 | Barrus | |
| 2012/0278738 A1 | 11/2012 | Kruse et al. | |
| 2013/0019182 A1 | 1/2013 | Gil et al. | |
| 2013/0047093 A1 | 2/2013 | Reuschel et al. | |
| 2013/0054636 A1 | 2/2013 | Tang | |
| 2013/0144950 A1 | 6/2013 | Sanakaranarasimhan et al. | |
| 2013/0218978 A1 | 8/2013 | Weinstein et al. | |
| 2013/0226444 A1 | 8/2013 | Johansson et al. | |
| 2013/0246644 A1 | 9/2013 | Garcia et al. | |
| 2013/0275885 A1 | 10/2013 | Spataro et al. | |
| 2013/0290416 A1 | 10/2013 | Nelson et al. | |
| 2013/0321314 A1 | 12/2013 | Oh et al. | |
| 2014/0019905 A1 | 1/2014 | Kim et al. | |
| 2014/0040767 A1 | 2/2014 | Bolia | |
| 2014/0068496 A1 | 3/2014 | Kim et al. | |
| 2014/0125580 A1 | 5/2014 | Eun et al. | |
| 2014/0149880 A1 | 5/2014 | Farouki | |
| 2014/0160153 A1 | 6/2014 | Singh | |
| 2014/0172996 A1 | 6/2014 | Deeter et al. | |
| 2014/0215336 A1 * | 7/2014 | Gardenfors | G06F 3/017 715/719 |
| 2014/0223334 A1 | 8/2014 | Jensen et al. | |
| 2014/0282077 A1 | 9/2014 | Wilson et al. | |
| 2014/0331166 A1 * | 11/2014 | Li | G06F 3/0481 715/772 |
| 2014/0356843 A1 | 12/2014 | Yang et al. | |
| 2014/0359518 A1 | 12/2014 | Wu | |
| 2014/0362165 A1 | 12/2014 | Ackerman et al. | |
| 2015/0161483 A1 | 6/2015 | Allen et al. | |
| 2015/0242397 A1 | 8/2015 | Zhuang | |

FOREIGN PATENT DOCUMENTS

| | | |
|---|---|---|
| CN | 102317984 A | 1/2012 |
| CN | 102681870 A | 9/2012 |
| CN | 103124442 A | 5/2013 |
| CN | 103441986 A | 12/2013 |
| EP | 1936483 A1 | 6/2008 |
| WO | 2009143294 A2 | 11/2009 |
| WO | 2010030610 A1 | 3/2010 |

OTHER PUBLICATIONS

"Blackboard Collaborative Web Conferencing: Essentials for Participants," Version 12.6, Available Online at www.blackboard.com/docs/documentation.htm?DocID=611004PDF, Nov. 1, 2013, 126 pages.

ISA European Patent Office, Invitation to Pay Additional Fees and, Where Applicable, Protest Fee Issued in Application No. PCT/US2015/030452, dated Sep. 22, 2015, WIPO, 5 pages.

ISA European Patent Office, International Search Report and Written Opinion Issued in Application No. PCT/US2015/030452, dated Nov. 5, 2015, WIPO, 17 pages.

Gericke, L. et al., "Message Capturing as a Paradigm for Asynchronous Digital Whiteboard Interaction," 6th IEEE International Conference on Collaborative Computing: Networking, Applications and Worksharing (CollaborateCom 2010), Oct. 2010, 10 pages.

(56) References Cited

OTHER PUBLICATIONS

"Deskscribble for Mac OS X—Scribble on top of your Desktop, on a Whiteboard or Blackboard," Deskscribble Website, Available as Early as May 14, 2011, at http:///www.deskscribbleapp.com/, Retrieved Jun. 19, 2014, 2 pages.
Schauland, D., "Easy Whiteboarding with ScreenChomp for iPad," TechRepublic Website, http://www.techrepublic.com/blog/apple-in-the-enterprise/easy-whiteboarding-with-screenchomp-for-ipad/, Aug. 3, 2011, 8 pages.
"Ink Serialization Sample (Windows)," Microsoft Website, Available as Early as Oct. 10, 2011, at https://msdn.microsoft.com/EN-US/LIBRARY/WINDOWS/DESKTOP/MS698127(V=VS.85).ASPX, Retrieved Oct. 27, 2015, 4 pages.
"MyScript Calculator—Handwriting calculator on the App Store on iTunes," Apple Website, Available as Early as Feb. 4, 2013, at https://itunes.apple.com/us/app/myscript-calculator/id578979413?mt=8, Retrieved Jun. 19, 2014, 3 pages.
Jeffers, "Whiteboard Like Apps," University of Delaware Website, http://sites.udel.edu/ipads/2013/02/21/whiteboard-like-apps/, Feb. 21, 2013, 5 pages.
Teachthought Staff, "8 Apps to Turn Your iPad Into a Digital Whiteboard," Teachthought Website, http://www.teachthought.com/apps-2/7-apps-to-turn-your-ipad-into-a-digital-whiteboard/, Feb. 23, 2013, 14 pages.
Li, J. et al., "iScreen: A Merged Screen of Local System with Remote Applications in a Mobile Cloud Environment," IEEE Seventh International Symposium on Service-Oriented System Engineering, Mar. 25, 2013, 9 pages.
Smorkalov, A. et al., "Collaborative Work with Large Amount of Graphical Content in a 3D Virtual World," 2013 IEEE International Conference on Interactive Collaborative Learning (ICL), Sep. 25, 2013, 10 pages.
Bradford, K., "Galaxy Note 10.1 2014 Edition Review," Liliputing Website, http://liliputing.com/2013/11/galaxy-note-10-1-2014-edition-review-incomplete.html, Nov. 23, 2013, 14 pages.
Kolb, J. et al., "Exploiting User Interest in Data-Driven Cloud-Based Mobile Optimization," 2nd IEEE International Conference on Mobile Cloud Computing, Services, and Engineering (MobileCloud 2014), Apr. 7, 2014, 8 pages.
"Lotus Sametime Quick Start Guide: Save Meeting Information and View It Later," Pinkbird Website, Retrieved Jun. 17, 2014, from http://pinkbird.com/sametime/stquickstartguide/H_SAVE_MEETING_INFORMATION_AND_VIEW_IT_LATER_942_OVER.html, 4 pages.
"BrightLink Pro Collaborative Whiteboarding Solution," Epson Website, Retrieved Jun. 19, 2014, from http://www.epson.com/cgi-bin/Store/jsp/Landing/brightlink-pro-collaborative-whiteboarding-solution.do, 4 Pages.
ISA European Patent Office, International Search Report and Written Opinion Issued in Application No. PCT/US2014/040144, dated Sep. 8, 2014, WIPO, 11 pages.
ISA European Patent Office, International Search Report and Written Opinion Issued in Application No. PCT/US2015/030458, dated Jul. 29, 2015, WIPO, 11 pages.
ISA European Patent Office, International Search Report and Written Opinion Issued in Application No. PCT/US2015/030456, dated Aug. 6, 2015, WIPO, 12 pages.
ISA European Patent Office, International Search Report and Written Opinion Issued in Application No. PCT/US2015/030455, dated Aug. 12, 2015, WIPO, 9 pages.
ISA European Patent Office, International Search Report and Written Opinion Issued in Application No. PCT/US2015/030454, dated Aug. 21, 2015, WIPO, 11 pages.
Adahl, Jonas, "Shared Resource for Collaborative Editing over a Wireless Network", In Master of Science Thesis, Dec. 2010, 274 pages.
IPEA European Patent Office, Second Written Opinion Issued in PCT Application No. PCT/US2015/030455, dated Mar. 29, 2016, WIPO, 5 Pages.
IPEA European Patent Office, Second Written Opinion Issued in PCT Application No. PCT/US2015/030452, dated May 11, 2016, WIPO, 9 Pages.
IPEA European Patent Office, International Preliminary Report on Patentability Issued in Application No. PCT/US2015/030455, dated Jul. 21, 2016, WIPO, 6 Pages.
IPEA European Patent Office, International Preliminary Report on Patentability Issued in Application No. PCT/US2015/030452, dated Aug. 5, 2016, WIPO, 10 Pages.
United States Patent and Trademark Office, Non-Final Office Action Issued in U.S. Appl. No. 14/493,085, dated Sep. 27, 2016, 13 Pages.
United States Patent and Trademark Office, Non-Final Office Action Issued in U.S. Appl. No. 14/516,497, dated Dec. 2, 2015, 22 Pages.
United States Patent and Trademark Office, Final Office Action Issued in U.S. Appl. No. 14/493,085, dated Apr. 3, 2017, 14 Pages.
"Non-Final Office Action Issued in U.S. Appl. No. 14/493,085", dated Aug. 17, 2017, 13 Pages.
"Non-Final Office Action Issued in U.S. Appl. No. 14/522,525", dated Sep. 8, 2017, 13 Pages.
"Non-Final Office Action Issued in U.S. Appl. No. 14/522,539", dated Aug. 11, 2017, 24 Pages.
"Office Action Issued in European Patent Application No. 15726793.1", dated Sep. 12, 2017, 11 Pages.
"Non Final Office Action Issued in U.S. Appl. No. 14/522,539", dated Jul. 23, 2018, 19 Pages.
"Notice of Allowance Issued in U.S. Appl. No. 15/270,288", dated May 17, 2018, 14 Pages.
"Office Action Issued in European Patent Application No. 15726792.3", dated Jun. 25, 2018, 7 Pages.
"Office Action Issued in European Patent Application No. 15726793.1", dated Aug. 1, 2018, 5 Pages.
Geyer, et al., "The design and the security concept of a collaborative whiteboard", In Journal of Computer Communications, vol. 23, Issue 3, Feb. 2000, pp. 233-241.
"First Office Action and Search Report Issued in Chinese Patent Application No. 201580025026.4", dated Sep. 4, 2018, 14 Pages.
"Final Office Action Issued in U.S. Appl. No. 14/493,085", dated Jan. 31, 2018, 12 Pages.
"Non-Final Office Action Issued in U.S. Appl. No. 15/270,288", dated Nov. 13, 2017, 32 Pages.
Lienhard, et al., "Multi-Layer Recording as a New Concept of Combining Lecture Recording and Students Handwritten Note", In Proceedings of the 10th ACM International Conference on Multimedia, Dec. 1, 2002, 4 pages.
Final Office Action Issued in U.S. Appl. No. 14/522,539, dated Dec. 8, 2017, 21 Pages.
"First Office Action and Search Report Issued in Chinese Patent Application No. 201580025142.6", dated: Jan. 16, 2019, 18 Pages.
"Office Action Issued in European Patent Application No. 15725941.7", dated: Nov. 16, 2018, 8 Pages.
"First Office Action and Search Report Issued in Chinese Patent Application No. 201580025023.0", dated: Jan. 23, 2019, 18 Pages.
Final Office Action Issued in U.S. Appl. 14/522,539, dated: Nov. 27, 2018, 24 Pages.

* cited by examiner

*T2*

*T3*

T4

SYSTEM AND METHOD PROVIDING COLLABORATIVE INTERACTION

CROSS REFERENCE TO RELATED APPLICATION

This application claims priority to U.S. Provisional Patent Application, Ser. No. 61/996,781, entitled "CLAIMING DATA FROM A VIRTUAL WHITEBOARD" filed on May 14, 2014, the entire disclosure of which is herein incorporated by reference.

BACKGROUND

Computing devices such as laptops, desktops, etc., may be locally projected to larger displays such as projectors, liquid crystal displays (LCDs), etc., to enable viewing of the content generated on the source computing device by a greater number of people during, for example, a presentation, meeting, etc. This type of projected viewing is useful in a large number of fields such as engineering, marketing, business, education, etc. Cords, such as video graphics array (VGA) cords, may be used to provide a wired connection between the source computing device and the projection device. However, it may be inefficient and time consuming to connect the computing device to the projection device in this way. More recently, wireless connectivity has been used to link the source computing devices to the projection devices, to simplify the connection process. While this type of connection may be established in less time than a wired connection, wirelessly connecting the devices in this way to enable projection still has a number of drawbacks. For instance, content displayed on the projection device can only be manipulated via the source computing device. This may be inconvenient, for example when the user is standing nearer to the display than the source computing device, or when several users are desiring to interact with the displayed content.

SUMMARY

A method for providing collaborative interaction between a receiver computing device and a sender computing device is provided. The method includes at the receiver computing device, establishing a local peer-to-peer wireless connection with a sender computing device, receiving from the sender computing device via the local peer-to-peer wireless connection data for a graphical user interface (GUI) of a remotely executed application program that is executed on the sender computing device, displaying the GUI on a display associated with the receiver computing device, receiving user input from an input device associated with the receiver computing device indicating a user interaction with the GUI, sending the user input to the sender computing device, receiving from the sender computing device data indicating an updated state of the GUI generated by the sender computing device based on the user input, and displaying the updated state of the GUI on the display associated with the receiver computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A local peer-to-peer wireless connection between a sender computing device and a receiver computing device is described herein, which enables the receiver computing device to provide expanded display as well as interactive capabilities to the sender computing device. Specifically in one example, the sender computing device is configured to send, via a peer-to-peer wireless connection, graphical data locally generated via an application program to the receiver computing device for presentation on a display associated with the receiver computing device. Correspondingly, a user may interact with the graphical data presented on the receiver computing device though manipulation of an input device of the receiver computing device, such as a touch screen. Subsequently, data corresponding to the input device interaction is sent back to the sender computing device for local processing on the sender computing device. In response to the local processing of the data, an updated state of a graphical user interface (GUI) is sent to the receiver computing device from the sender computing device. The updated state of the GUI reflects commands or other programmatic functions implemented via the sender computing device based on the locally processed input device data. In this way, the receiver computing device can act as a remote display (e.g., projection device) while providing with interactive capabilities (e.g., touch input, stylus input, etc.,) with graphical data remotely processed on the sender computing device. It will be appreciated that this type of system may be used in presentation formats or other collaborative settings where multiple individuals are interacting in a social context. In such a context, the system can enhance social interaction between individuals through expanded interactive capabilities of a receiver computing device (e.g., projection device).

Figure 1:
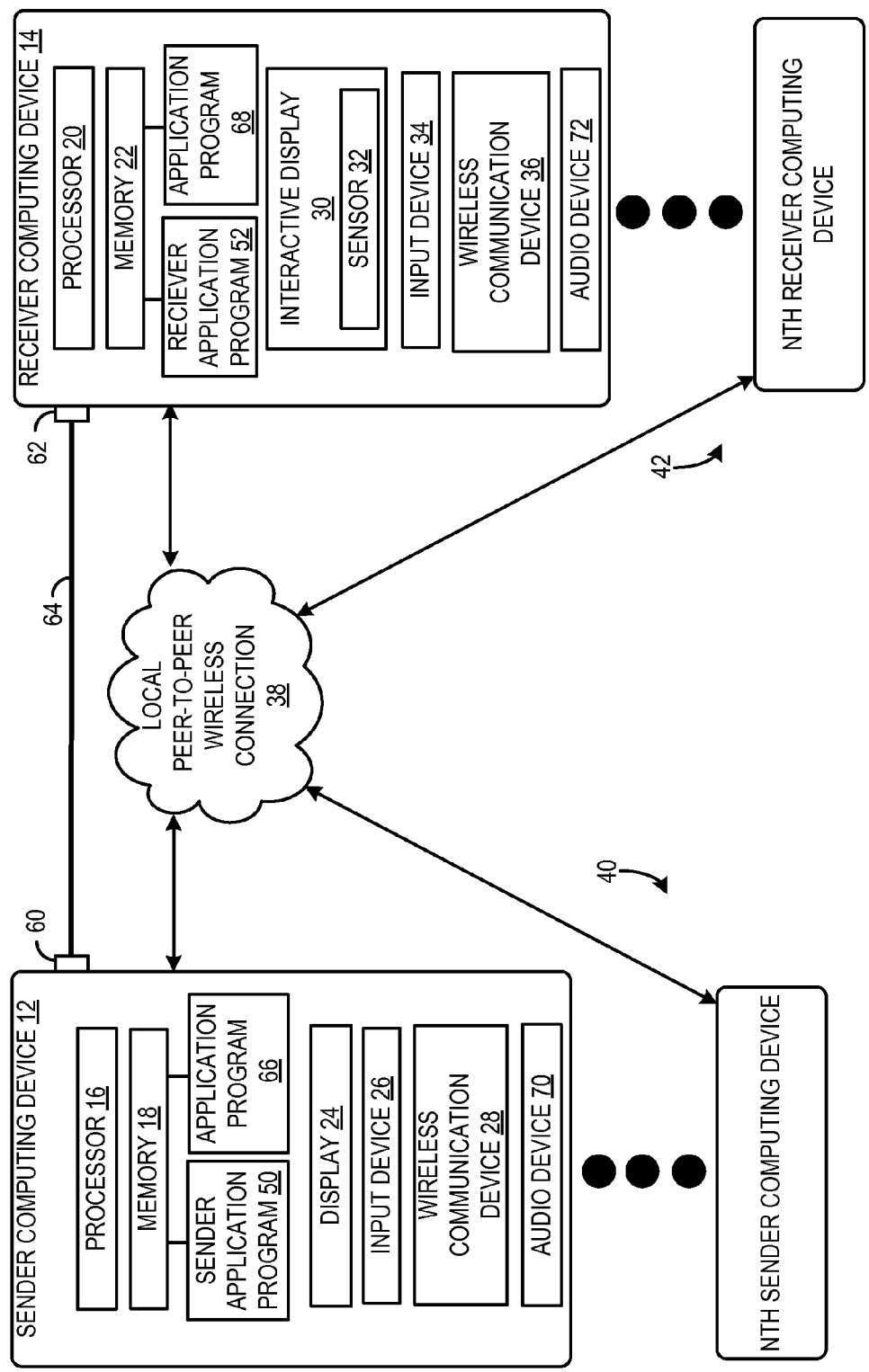
FIG. 1 is a schematic depiction of an example computing system.

FIG. 1 illustrates a computing system 10 including a sender computing device 12 and a receiver computing device 14. It will be appreciated that the sender computing device may a suitable computing device including, but not limited to, a desktop computing device, a laptop computer, a portable electronic device, a tablet computing device, media player, mobile telephone, etc. The receiver computing device may be a computing device with a larger display, for example. Specifically in one example, the receiver computing device may be a large format (e.g., greater than 40 inches) screen display with application program processing capabilities, which for example, may be mounted on a wall in a classroom, conference room, or office for use in group interactions. However, a multitude of different types of computing devices have been contemplated. An exemplary embodiment of the receiver computing device is described in greater detail herein with regard to FIG. 2.

As illustrated the sender computing device 12 includes a processor 16 and memory 18. Likewise, the receiver computing device 14 includes a processor 20 and a memory 22. The memory 18 and memory 22 includes code stored therein executable by the associated processor to implement the methods, techniques, routines, and other functions described herein.

The sender computing device 12 further includes a display 24 (e.g., liquid crystal display (LCD), active-matrix organic light emitting (AMOLED), cathode ray tube (CRT), etc.,), an input device 26 (e.g., mouse, keyboard, touch-pad, track-pad, touch sensitive display, combinations thereof etc.), and a wireless communication device 28 (e.g., Bluetooth device, WI-FI device, near field communication device, infrared communication, wireless modem, combinations thereof, etc.). It will be appreciated that a WI-FI device may be configured to support a WI-FI direct connection which enables the computing devices to communicate without a wireless access point, if desired. Therefore, in some examples the WI-FI device may be referred to as a WI-FI direct device.

The sender computing device 12 may further include a connection port 60 supporting a wired connection with the sender computing device. In this way, the sender computing device 12 can send/receive electronic data via a wired connection, if desired. A multitude of suitable connection ports or combinations of connection ports have been contemplated. For instance, the connection port 60 may be a Universal Serial Bus (USB) port, an Ethernet port, Fire-Wire, video graphics array (VGA), a combination thereof, etc. The sender computing device 12 may also include an audio device 70 configured to project and/or receive audio signals. Thus, the audio device 70 may include one or more of a speaker, microphone, etc. It will be appreciated that the display 24, input device 26, wireless communication device 28, connection port 60, and/or audio device 70 are in electronic communication with the processor 16 and memory 18 as well as one another, in some examples.

Additionally, the sender computing device 12 and the receiver computing device 14 may be co-located, in one example. For instance, the computing devices (12 and 14) may be located in the same room, building, structure, etc. The distance between the sender computing device and receiver computing device may be determined via the characteristics of the wireless communication devices used to provide wireless connectivity. It will be appreciated that it may be desirable for the computing devices to be positioned nearby to one another to enable user(s) to interact with both of the computing devices over a wireless local area network (WLAN), if desired. However in other examples the sender and receiver computing devices may be positioned at remote locations and connected via a wider network, such as a wide area network (WAN).

The receiver computing device 14 includes an interactive display 30 (e.g., interactive touch sensitive display) including a sensor 32 (e.g., touch sensor), an input device 34 (e.g., mouse, keyboard, track-pad, touch-pad, combinations thereof, etc.), and a wireless communication device 36 (e.g., Bluetooth device, WI-FI device, near field communication device, wireless modem, combinations thereof, etc.). In one example, the interactive display 30 may have a larger viewing area than the display 24. In this way, the interactive display 30 may be easily viewed by a number of people, if desired. Consequently, receiver computing device 14 may be utilized in meeting, presentations, lectures, etc., if desired.

Further in some examples, the sensor 32 may be a capacitive sensor (e.g., capacitive touch sensor) configured to detect an electrical change from a touch or stylus input implemented by a user. A stylus input may be an in input, in one example. However, other types of touch sensors have been contemplated such as an optical touch sensor, a resistive touch sensor, etc. The receiver computing device 14 may also include a connection port 62 supporting a wired connection. In this way, the receiver computing device 14 can send/receive electronic data via a wired connection, if desired. A multitude of suitable connection ports or combinations of connection ports have been contemplated. For instance, the connection port 62 may be a Universal Serial Bus (USB) port, an Ethernet port, Fire-Wire, video graphics array (VGA), or a combination thereof. The receiver computing device 14 may also include an audio device 72 configured to project and/or receive audio signals. Thus, the audio device 72 may include one or more of a speaker, microphone, etc. It will be appreciated that the interactive display 30, input device 34, wireless communication device 36, and/or audio device 72 are in electronic communication with the processor 20 and memory 22 as well as one another, in some examples. Other touch sensing technologies may alternatively be adopted, such as optical touch sensing using frustrated total internal reflection, or camera-in-pixel technologies.

The wireless communication devices (28 and 36) are configured to enable the computing devices (12 and 14) to wirelessly connect via a local peer-to-peer connection (e.g., local bi-directional peer-to-peer wireless connection). Thus, the sender computing device 12 and the receiver computing device 14 may be in wireless communication via a local peer-to-peer wireless connection 38. The local peer-to-peer wireless connection 38 may include a Bluetooth connection and/or a WI-FI connection (e.g., WI-FI direct connection). The Bluetooth connection may be used to broadcast, discover, and establish connections between devices, which requires a relatively small amount of data transfer, and the WI-FI connection may be used to transfer large files between the devices. In one example, the computing devices may only be electronically connected via the local peer-to-peer wireless connection, and may not share any other network connection over which data may be transferred between the devices. In one example, the computing devices may only be electronically connected via the local peer-to-peer wireless connection, and may not share any other network connection over which data may be transferred between the devices. Further in one example, the computing devices may be electronically connected via the wireless connection (i.e., local peer-to-peer wireless) over a local network (e.g., local area network (LAN)), and they may both be connected to the same wireless access point. Still further in other examples, the computing devices may be connected by both a wired and wireless connection. Therefore, it will be appreciated that the sender computing device 12 and receiver computing device 14 can be linked via a wired connection 64, if desired. The wired connection 64 may include one or more cables, cords, etc., configured to connect to the connection port 60 of the sender computing device 12 and the connection port 62 of the receiver computing device 14. Still further in one example, a local area network may not be used to connect the computing devices and there may be no intermediary devices (e.g., computing devices, servers, etc.,) in the communication path between the sender computing device 12 and the receiver computing device 14. Therefore, the sender computing device 12 may be in direct wireless communication with the receiver computing device 14 via the local peer-to-peer wireless connection, using an ad-hoc point to point connection rather than a shared computer network.

It will be appreciated that the computing system 10 may further include a plurality of sender computing devices 40 and a plurality of receiver computing devices 42. The plurality of sender computing devices 40 and receiver computing devices 42 may include similar components to the sender computing device 12 and receiver computing device 14, respectively. However it will be appreciated that the type, size, etc., of the specific components in the devices may vary from device to device. Additionally, the plurality of sender computing devices 40 may be in wireless communication via the plurality of receiver computing devices 42 via the local peer-to-peer wireless connection 38.

A sender application program 50 may be stored in the memory of the 18 of the sender computing device 12. The sender application program 50 may be configured to provide the interactive wireless connectivity with the receiver computing device 14, described in greater detail herein. Likewise, a receiver application program 52 may be stored in the memory of the 22 of the receiver computing device 14. The receiver application program 52 may be configured to provide the interactive wireless connectivity with the sender computing device 14, described in greater detail herein. Thus, the sender application program 50 and the receiver application program 52 may work together to provide the peer-to-peer wireless connectivity (e.g., local bi-directional peer-to-peer wireless connectivity) between the computing devices. However in other examples alternate programmatic elements may be used to carry out this functionality. The sender computing device 12 may also be configured to locally execute another application program 66. It will be appreciated that the application program 66 may be referred to as a second application program. The application program 66 may be a spreadsheet application program, a word processing application program, a drawing application program, a web browser application program, an email application program, etc. It will be appreciated that in one example, graphics corresponding to the application program 66 may be presented within a GUI corresponding to the sender application program 50. However, other graphical configurations have been contemplated. Likewise, the receiver computing device 12 may also be configured to locally execute an application program 68. The application program 68 may be a graphics editing application program, a whiteboard application program, a spreadsheet application program, a word processing application program, a video editing application program, a drawing application program, etc. In one example, the application program 66 may be different than the application program 68. Additionally, it will be appreciated that in one example, graphics corresponding to the application program 68 may be presented within a GUI corresponding to the receiver application program 52.

The aforementioned application-programs may be executed via corresponding processor and memory in the corresponding computing device. Furthermore, the application programs may be executed in the context of a desktop environment provided by an operating system stored in memory. However, the application programs may be provided via other programmatic framework, in other examples.

Figure 2:
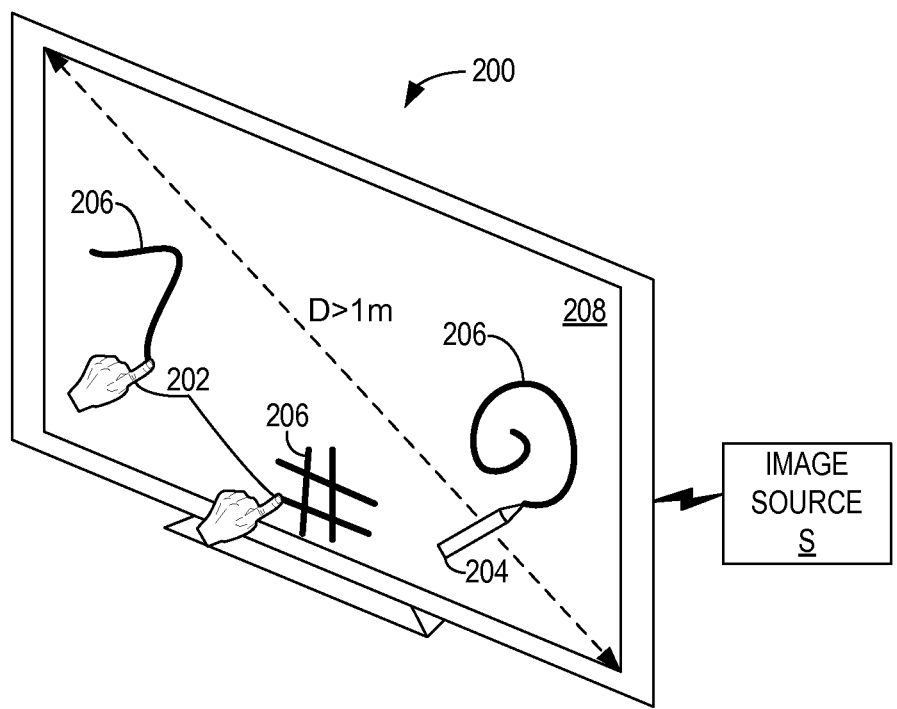
FIG. 2 is an illustration of an example receiver device.

FIG. 2 shows an example receiver computing device 200. The receiver computing device 200 may be similar to the receiver computing device 14 shown in FIG. 1. Therefore, the receiver computing device 200 may include memory and a processor as well as the other components in the receiver computing device 14 shown in FIG. 1. Specifically, the receiver computing device may be a large format multi-touch computing device 200 in accordance with an example of the present disclosure. Receiver computing device 200 may have a diagonal dimension greater than 1 meter, for example. In other, particularly large-format examples, the diagonal dimension may be 55 inches or greater. Specifically, in one example the receiver computing device may have a larger display than the sender computing devices to which it is wirelessly connected. Receiver computing device 200 may be configured to sense multiple sources of touch input, such as touch input applied by a digit 202 of a user or a stylus 204 manipulated by the user. It will be appreciated that a plurality inputs (e.g., touch and/or stylus inputs) implemented at of simultaneous or overlapping time intervals can be sensed via the receiver computing device 200. Thus, the receiver computing device 200 may include a touch sensor, such as a capacitive touch sensor, as previously discussed.

Receiver computing device 200 may be connected to an image source S, such as an external computer or onboard processor. Image source S may receive multi-touch input from receiver computing device 200, process the multi-touch input, and produce appropriate graphical output 206 in response. Receiver computing device 200 may include a touch-sensitive display 208 (e.g., capacitive touch-sensitive display) to enable multi-touch sensing functionality.

Figure 3:
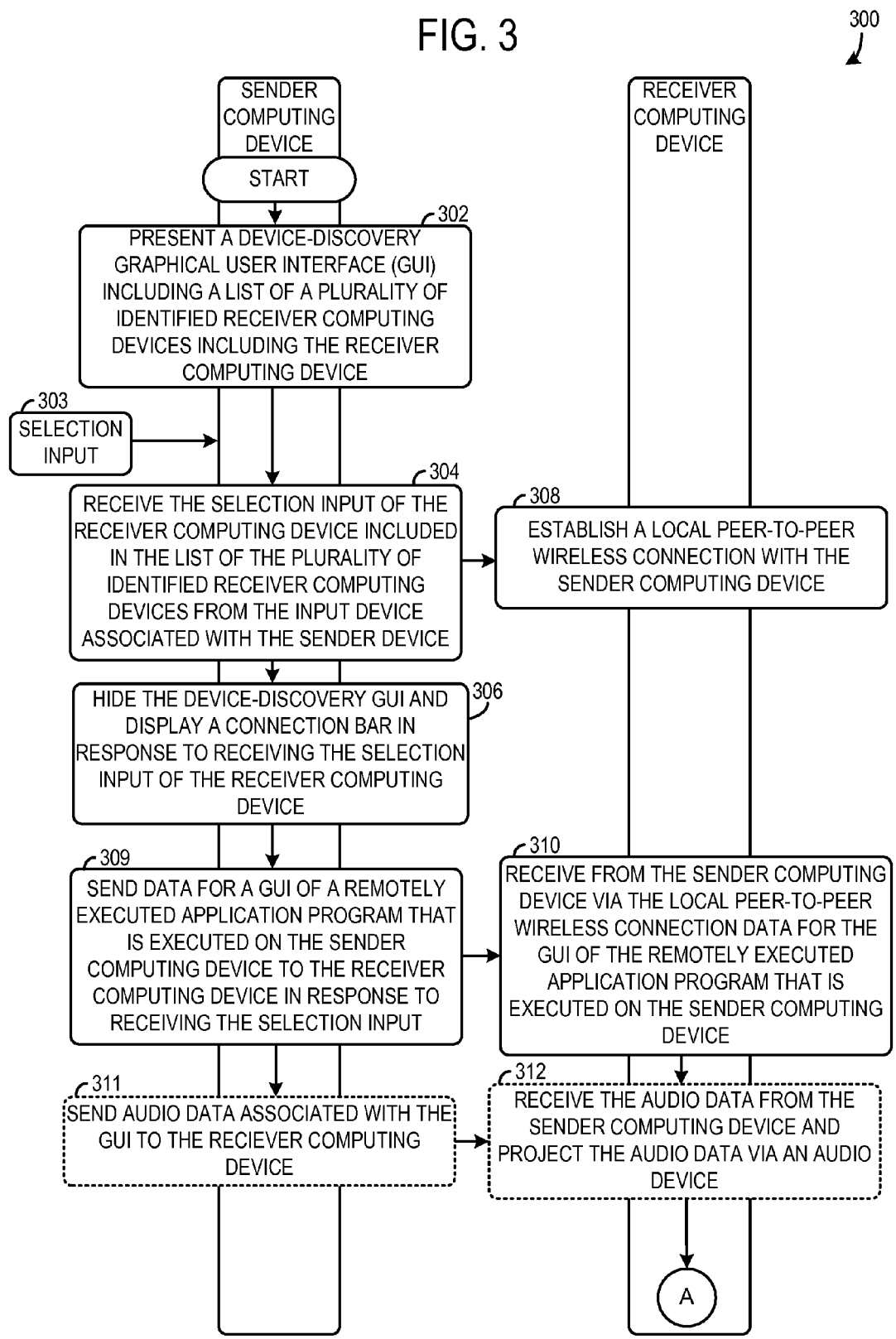
FIGS. 3-4 illustrate a flowchart of one example of a method for providing collaborative interaction between a sender computing device and a receiver computing device.
Figure 4:
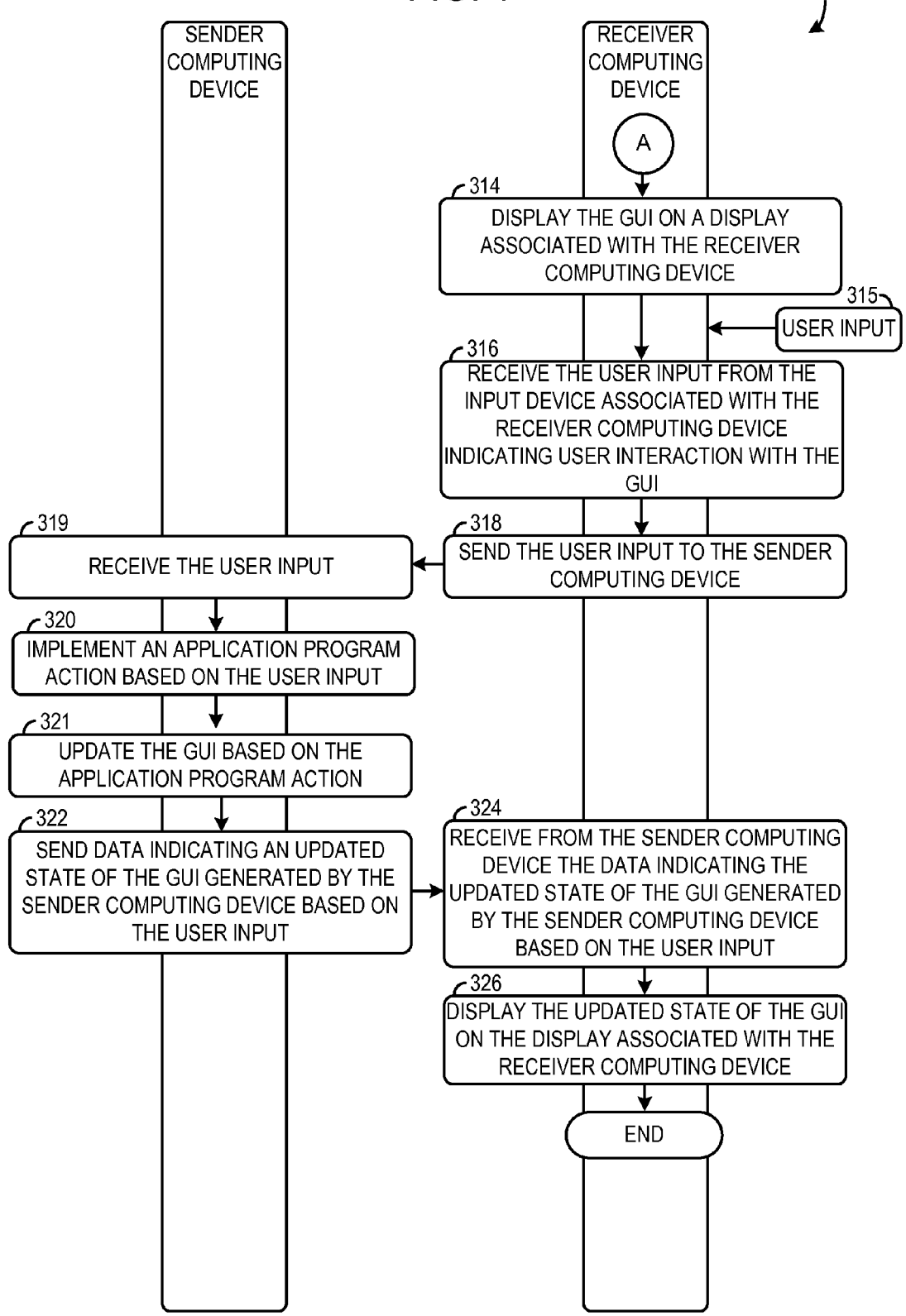

Turning now to FIGS. 3-4, a method 300 for providing collaborative interaction between a receiver computing device and a sender computing device is illustrated. Method 300 may be implemented using the hardware and software components of the systems and devices described above. In particular, the method may be implemented via the sender computing device 12 and the receiver computing device 14 as code stored in memory executable by a processor. Specifically in one example, the method 300 may be implemented via the sender application program 50 and the receiver application program 52. In such an example, the steps which are indicated as implemented via the sender computing device are implemented via the sender application program and the steps which are indicated as implemented via the receiver computing device are implemented via the receiver application program. However, in alternate embodiments the method 300 may be implemented using other suitable hardware and software components.

As shown in FIG. 3 the method 300 includes at 302, at the sender computing device, presenting a device-discovery graphical user interface (GUI) including a list of a plurality of identified receiver computing devices including the receiver computing device. In one example, the plurality of identified receiver computing devices in the list are identified via wireless connectivity. Therefore, the sender computing device may be configured to wirelessly communication with the receiver computing device. Further in one example, the plurality of identified receiver computing devices in the list may be identified based on a distance between the sender computing devices and the receiver computing devices. Still further in on example, the distances are determined based on one or more of WI-FI communication, Bluetooth communication, and near field communication (NFC). In yet another example, a relative position of each of the plurality of identified receiver computing devices in the list is determined based on a frequency of bi-directional communication sessions between the receiver computing devices and the sender computing device and/or the date and time (e.g., recency) of bi-directional communication sessions between the receiver computing devices and the sender computing device. Specifically in one example, the frequency and recency may be weighted in an algorithm which determines the order of the identified receiver computing devices displayed. In this way, receiver computing devices which a user is more likely to select can be presented where they may be more easily viewed on the display. However, numerous device-discovery GUI configurations have been contemplated. In another example, the list includes thumbnails, i.e., preview images, associated with the plurality of identified receiver computing devices. For instance, the receiver computing devices may be represented as thumbnails in the list of identified receiver computing devices. A thumbnail is a reduced sized version of a picture, image, and/or graphic.

Next at 303 the method includes at an input device, providing selection input to the sender computing device through an input device associated with the sender computing device. The selection input is a selection of a receiver computing device included in the list of the plurality of identified receiver computing devices. The input device may be a mouse, touch-pad, track-pad, keyboard, touch-screen, microphone, camera, a combination thereof, etc., and therefore the selection input may be data generated via the input device and transferred to the computing device. For instance, the selection input may include depression of a mouse button while a pointer is adjacent to one of the graphical representations of the identified receiver computing devices in the list. Therefore, the selection input includes data indicating selection of a receiver computing device included in the list of the plurality of identified receiver computing devices. It will be appreciated that the input device may be connected to the sender computing device via a wired and/or wireless connection. For instance, a USB and/or Bluetooth connection may be used to connect the input device to the sender computing device. However, in other examples the input device may be integrated into the sender computing device. Therefore, the selection input may be internally provided (e.g., transferred) to the processing system of the sender computing device.

Next, at 304, the method includes, at the sender computing device, receiving the selection input of the receiver computing device included in the list of the plurality of identified receiver computing devices from the input device associated with the sender computing device.

At 306 the method includes, at the sender computing device, hiding the device-discovery GUI and displaying a connection bar in response to receiving the selection input of the receiver computing device. In this way, the interface may be concealed to provide additional space for other graphics in the GUI.

Next, at 308, the method includes, at the receiver computing device, establishing a local peer-to-peer wireless connection with the sender computing device. In one example, the local peer-to-peer wireless connection is a WI-FI connection, a Bluetooth connection, or WI-FI Direct connection. Further in one example, the sender computing device may initiate establishing the local peer-to-peer connection.

At 309 the method includes, at the sender computing device, sending data for a GUI of a remotely executed application program that is executed on the sender computing device to the receiver computing device in response to receiving the selection input.

At 310 the method includes, at the receiver computing device, receiving from the sender computing device via the local peer-to-peer wireless connection data for the GUI of the remotely executed application program that is executed on the sender computing device.

In some embodiments the peer-to-peer wireless connection between the sender computing device and the receiver computing device may support audio transfer. Therefore in some embodiments the method may include at 311 sending audio data associated with the GUI to the receiver computing device in response to establishing the local peer-to-peer connection between the sender computing device and receiver computing device and at 312 receiving the audio data from the sender computing device at the receiver computing device and projecting the audio data via an audio device. It will be appreciated that projecting audio data include sending an audio signal to a speaker. In this way, audio data may be transferred between the computing devices, to further enhance the collaborative interaction. However, in other examples audio transfer may not be supported by the receiver computing device.

Now referring to FIG. 4, at 314 the method includes, at the receiver computing device, displaying the GUI on a display (e.g., interactive display) associated with the receiver computing device. In one example, the GUI is displayed within a window on the display (e.g., interactive touch sensitive display), the window associated with an application program locally executed on the receiver computing device. In one example, on the GUI is displayed on the receiver computing devices other sending computing devices may be inhibited from sending GUIs to the receiver computing device for display. Specifically in one example the display GUI may replace a GUI of another sender computing device. In this way, the sender computing device may interrupt another session between a $2^{nd}$ sender computing device and the receiver computing device. However, in other examples this type of display interruption may be inhibited. Still further in other examples a plurality of sender computing devices may be permitted to send GUIs to the receiver computing device for display. In this way, a plurality of users may simultaneously present content on a display at one time, facilitating collaborative interaction between many users.

At 315 the method includes, at an input device associated with the receiver computing device, providing user input to the receiver computing device. In one example, the input device is a touch sensor of a touch sensitive display associated with the receiver computing device configured to sense touch of a digit of a user or a stylus. In such an example, the user input is a touch input corresponding to the sensed touch of the digit of the user or an ink input corresponding to the sensed touch of the stylus. However, in other examples the input device may be a touch-pad, mouse, keyboard, etc.

Next at 316 the method includes, at the receiver computing device, receiving the user input from the input device associated with the receiver computing device indicating user interaction with the GUI.

Next at 318 the method includes, at the receiver computing device, sending the user input to the sender computing device. At 319 the method includes, at the sender computing device, receiving the user input.

At 320 the method includes, in response to receiving the user input, implementing an application program action (e.g., command) based on the user input, at the sender computing device. Therefore, it will be appreciated that the application program action may be implemented in an application program, such as application program 66, shown in FIG. 1. The action could be any suitable action, and by way of example may include drawing on a slide, changing a slide, change alpha-numeric data in a cell, actuating a slider on a graph, etc. In this way, the receiver computing device may act as an interactive peripheral device which returns user input to application programs locally executed on the sender computing device. As a result, a user is provided with a rich interactive experience, which enables intuitive and collaborative interaction during, for example, a meeting, presentation, seminar, class, etc. Next, at 321 the method includes updating the GUI based on the application program action (e.g., command).

Next, at 322 the method includes, at the sender computing device, sending data indicating an updated state of the GUI generated by the sender computing device based on the user input. Specifically, in one example, the updated state reflects a graphical change in the GUI based on an action executed via the application program remotely on the sender computing device. It will be appreciated that the action may be implemented in response to receiving the user input at the sender computing device.

At 324 the method includes receiving from the sender computing device data indicating the updated state of the GUI generated by the sender computing device based on the user input. It will be appreciated that the data may be referred to as a GUI update. Next at 326 the method includes displaying the updated state of the GUI on the display associated with the receiver computing device. Exemplary updated states include selection of a button, movement of an object, selection of a field, execution of a search query, etc. It will be appreciated that the updated state may include a multitude of graphical changes associated with programmatic actions implemented via the application-program on the sender computing device.

In some embodiments, the methods and processes described herein may be tied to a computing system of one or more computing devices. In particular, such methods and processes may be implemented as a computer-application program or service, an application-programming interface (API), a library, and/or other computer-program product.

FIGS. 5-8 show GUIs which may be displayed (e.g., sequentially displayed) prior to and during a connection session between a receiver computing device (e.g., receiver computing device 14 shown in FIG. 1) and a sender computing device (e.g., sender computing device 12 shown in FIG. 1). Therefore, it will be appreciated that the display 24 and the interactive display 30, shown in FIG. 1, may present the GUIs shown in FIGS. 5-8. Specifically, a sequence of GUIs which may be executed and displayed via the sender computing device 12 and the receiver computing device 14, shown in FIG. 1, is illustrated in FIGS. 5-8. Thus, the GUIs in the Figures are sequentially implemented at times T1, T2, T3, and T4. Furthermore, the GUIs shown in FIGS. 5-8 are representations of exemplary GUIs that may be generated and displayed during implementation of the method 300.

Figure 5:
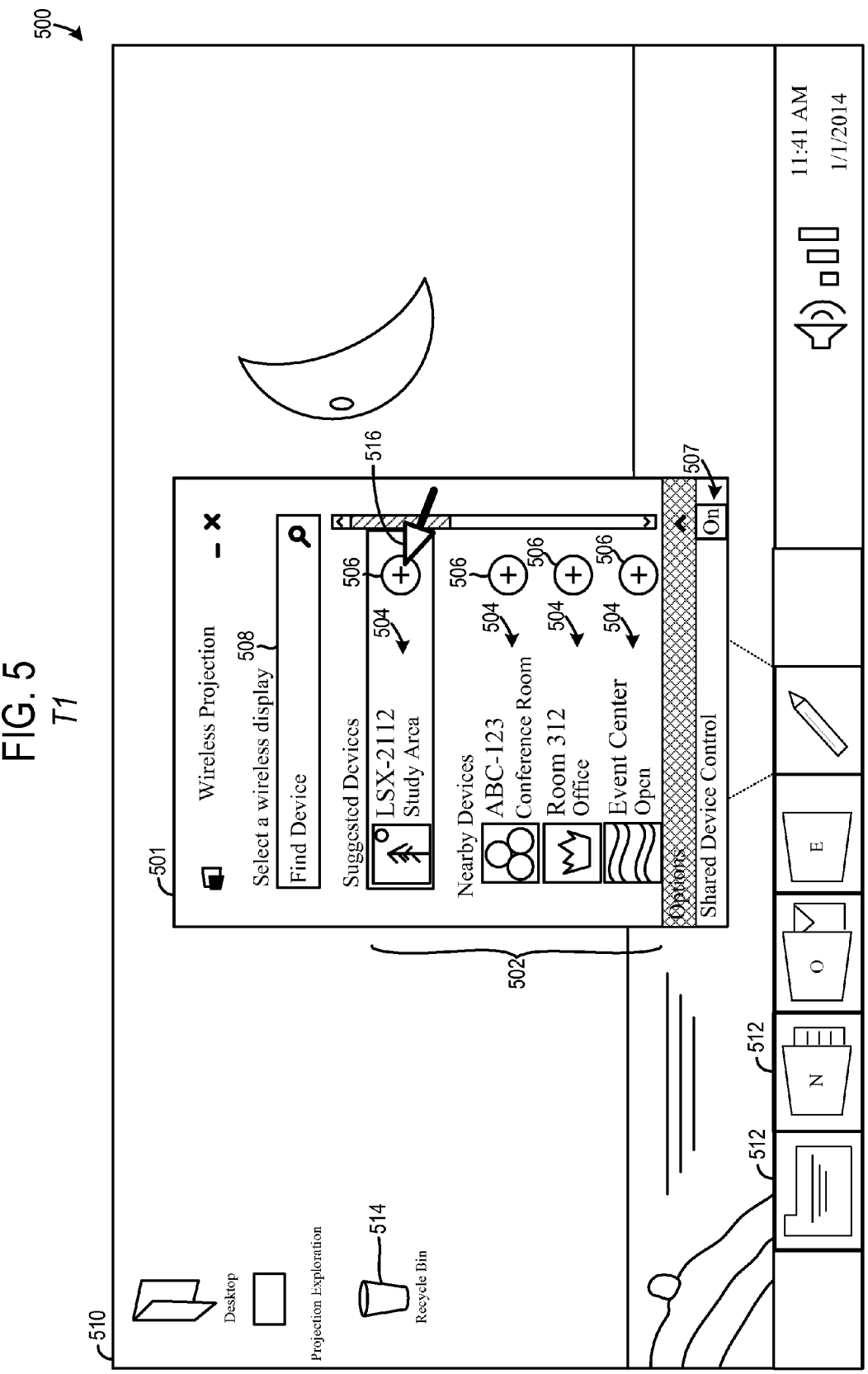
FIGS. 5-6 are an illustrations of graphical user interfaces (GUIs) displayed on the sender computing device.
Figure 6:
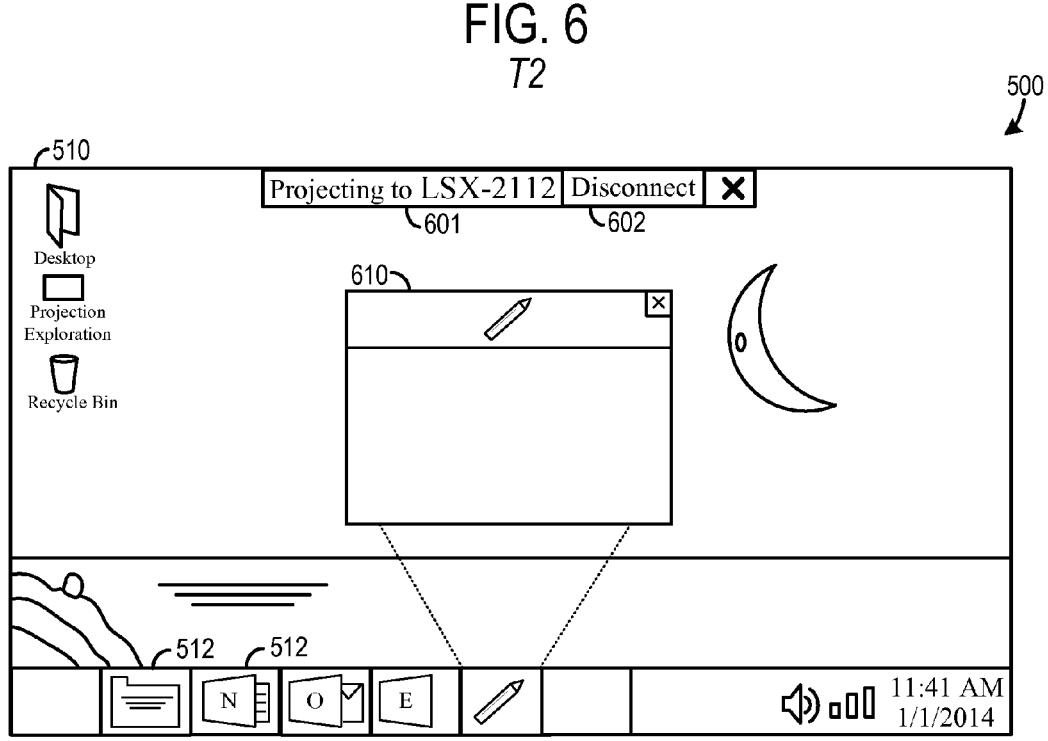

Specifically, FIGS. 5-6 show a GUI 500 which may be executed and displayed via the sender computing device 12, shown in FIG. 1. Thus the GUIs may be displayed on the display 24, shown in FIG. 1. Specifically, the GUI shown in FIGS. 5-6 may be displayed while a connection session between the sender computing device and the receiver computing device is being established.

FIG. 5 illustrates an example GUI 500. The GUI 500 may correspond to the sender application program 50 shown in FIG. 1. Continuing with FIG. 5, the GUI 500 includes a window 501, in the illustrated example. A list 502 of a plurality of identified receiver computing devices 504 is shown within the window 501 (e.g., device-discovery window). In the depicted embodiment, the window 501 is presented in a larger window 510. However in other examples, the window 501 may be presented in another configuration. The window 510 include various graphical elements such as application program icons 512, a recycle bin icon 514, etc.

Each receiver computing device in the list 502 may include graphics (e.g., thumbnails) and/or alphanumeric symbols associated with the device. In this way, a user may more easily recognize the device that they would like to connect to. As shown the list 502 may include suggested devices. The devices may be suggested based on how recently and/or how often the sender computing device and the receiver computing device have had bi-directional communication sessions. Moreover, the physical or logical location of the receiver computing devices presented in the list may be selected based on a determined physical distance between the devices, or on a logical location of the device on a network, for example, on the same subnet. The distances may be determined based on a WI-FI signal, a Bluetooth signal, a NFC signal, subnet discovery, or a combination thereof. In this way, receiver computing devices which are closer to the sender computing device and therefore more likely to be connected to one another are conveniently displayed in the GUI. As shown, the list includes the receiver computing devices positioned above and below one another in a vertical configuration. However, other formats for displaying the receiver computing devices have been contemplated. For instance, the list may have a horizontal configuration. Still further in other examples, the receiver computing devices may be presented in a tile configuration, where each receiver computing device in the list is displayed in a tile in a grid.

Buttons 506 or other suitable selectors may also be provided in the GUI 500 which enables the user to initiate wireless connectivity with a desired receiver computing device. A selector 507 may also be provided which enables a user to permit or inhibit local peer-to-peer wireless connectivity between the sender computing device and the receiver computing devices. As shown, a search field 508 may be provided in the GUI 500 which enables a user to search for a receiver computing device. The search field 508 enables a user to enter desired symbols which may indicate the devices associated with the symbols (e.g., terms) in the search field. Additionally a button may be provided in the GUI which enables a user to discontinue wireless connectivity between the receiver computing device and the sender computing device.

A selection input 516 of one of the receiver computing devices in the list 502 is also shown in FIG. 5. In the depicted example, the selection input is implemented via a cursor which may be associated with an input device, such as a mouse. However, numerous types of selection inputs have been contemplated, such as a touch gesture. In response to the selection input the sender computing device establishes a local peer-to-peer wireless connection with the selected receiver computing device.

FIG. 6 illustrates the GUI 500 after the local peer-to-peer wireless connection is established between the computing devices. The desktop 510 of the GUI 500 is still displayed. Additionally, it will be appreciated that a plurality of application programs corresponding to the icons 512 may be displayed within the window 510. As shown in FIG. 6, the device-discovery window 501, shown in FIG. 5, is hidden from view and a small icon 601 indicating the sender computing device's wireless peer-to-peer connection with the selected receiver computing device is displayed. As shown, a button 602 may be provided in the GUI 500 to enable a user to disconnect the sender computing device from the selected receiver computing device.

An application program window 610 is also shown in FIG. 6. The application program window 610 corresponds to a drawing application program in the depicted example. However, other types of application programs may be displayed in via one or more windows in other examples.

Figure 7:
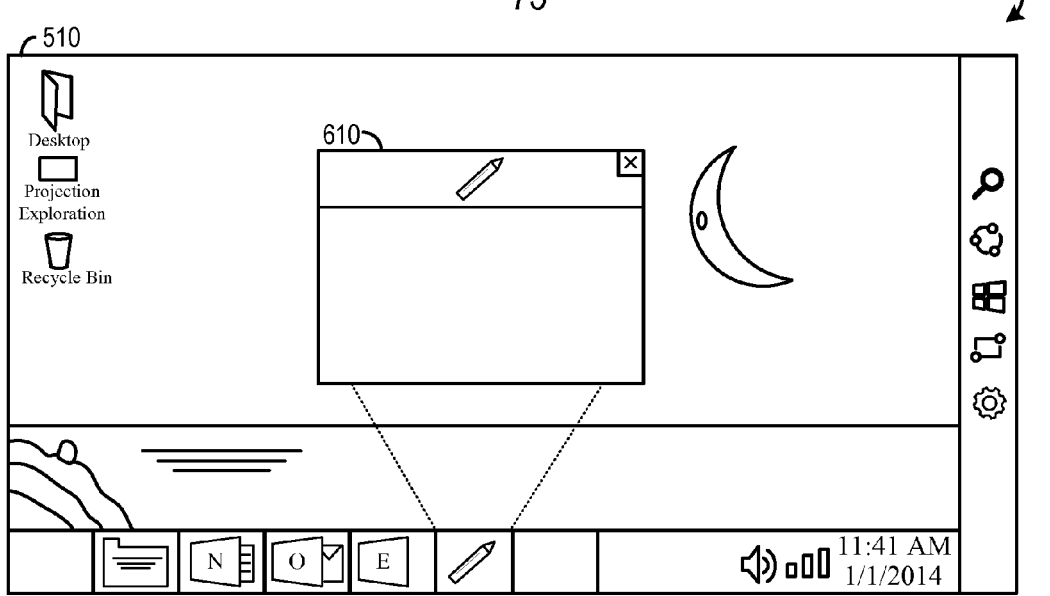
FIGS. 7-8 are illustrations of a GUIs displayed on the receiver computing device.

FIG. 7 illustrates an example GUI 700, which may be displayed on the interactive display 30 of the receiver computing device 14, shown in FIG. 1. The window 510 and the application program window 610 corresponding to the sender computing device are displayed. It will be appreciated that the windows 510 and 610 are executed via the sender computing device and then sent to the receiver computing device over the local peer-to-peer wireless connection for display. In this way, the receiver computing device provides projection functionality to the sender computing device.

Figure 8:
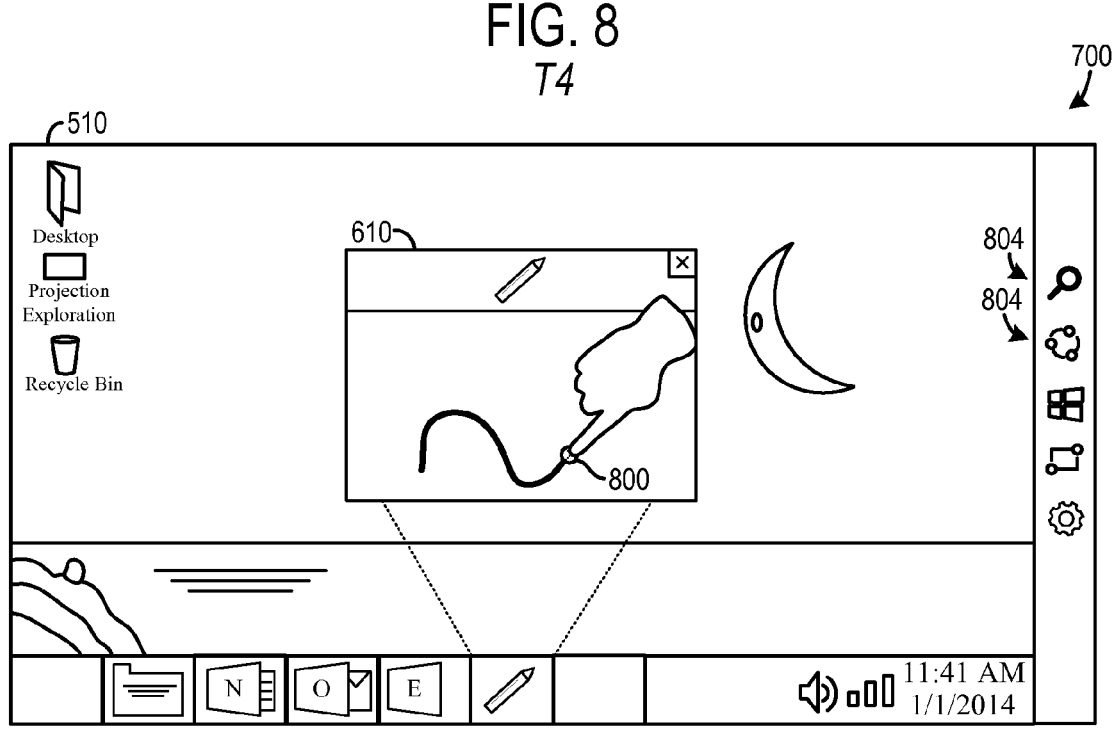

FIG. 8 shows the GUI 700 after user input is received by the receiver computing device and sent to the sender computing device. In particular, user input in the form of a touch contact 800 with a touch sensitive display is shown in FIG. 8. The receiver computing device receives the user input and then subsequently sends the user input to the sender computing device.

In response to receiving the user input the sender computing device updates the GUI 500, shown in FIG. 6, based on an application program action implemented responsive to the user input. Subsequently, the sender computing device sends data indicating an updated state of the GUI generated by the sender computing device based on the user input. The GUI 700 is then updated based on the updated state. In the embodiment illustrated in FIG. 8, updating the GUI 700 includes drawing a line in the application program window 610. In this way, the receiver computing device can be used to interact with the content display thereon and remotely processed on the sender computing device. As a result, the functionality of the receiver computing device is expanded. Additionally, FIG. 8 shows locally executed buttons 804 are displayed in the GUI 700. The buttons are provided by the receiver computing device to enable additional manipulation of content displayed on the receiver computing device and remotely executed by the sender computing device. In this way, the receiver computing device may include a set of local processing functions.

Using the systems and methods described above, a user can interact with content presented on a receiver computing device, even though the content is remotely executed by an application program on the sender computing device. Consequently, the functionality of the receiver computing device is expanded, which enables a user to easily manipulate content presented on the receiver computing device (e.g., projection device) but locally processed via the sender computing device, during a presentation or meeting, for instance.

Returning to the hardware configuration of the system described above, the processors described herein may include one or more physical devices configured to execute instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The processors may include one or more components configured to execute software instructions. Additionally or alternatively, the processors may include one or more hardware or firmware logic machines configured to execute hardware or firmware instructions. The processors may be single-core or multi-core, and the instructions executed thereon may be configured for sequential, parallel, and/or distributed processing. Individual components of the processors optionally may be distributed among two or more separate devices, which may be remotely located and/or configured for coordinated processing. Aspects of the processors may be virtualized and executed by remotely accessible, networked computing devices configured in a cloud-computing configuration.

The memory described herein may include removable and/or built-in devices. The memory described herein may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The memory described herein may include volatile, nonvolatile, dynamic, static, read/write, read-only, random-access, sequential-access, location-addressable, file-addressable, and/or content-addressable devices.

It will be appreciated that memory described herein includes one or more physical devices. However, aspects of the instructions described herein alternatively may be propagated by a communication medium (e.g., an electromagnetic signal, an optical signal, etc.) that is not held by a physical device for a finite duration.

Aspects of the processors and memory described herein may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "application program" may be used to describe an aspect of the computing system implemented to perform a particular function. In some cases, the application program may be instantiated via a processor executing instructions held by memory. It will be understood that different application programs may be instantiated from the same service, code block, object, library, routine, API, function, etc. Likewise, the same application program may be instantiated from different services, code blocks, objects, routines, APIs, functions, etc. The terms "application program" may encompass individual or groups of executable files, data files, libraries, drivers, scripts, database records, etc.

When included, display devices may be used to present a visual representation of data held by memory. This visual representation may take the form of a GUI. As the herein described methods and processes change the data held by memory, and thus transform the state of the memory, the state of the displays may likewise be transformed to visually represent changes in the underlying data. Display devices may be combined with processor and memory in a shared enclosure, or such display devices may be peripheral display devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. According to one aspect, a method for providing collaborative interaction between a receiver computing device and a sender computing device is provided. The method includes at the receiver computing device, establishing a local peer-to-peer wireless connection with a sender computing device; receiving from the sender computing device via the local peer-to-peer wireless connection data for a graphical user interface (GUI) of a remotely executed application program that is executed on the sender computing device; displaying the GUI on a display associated with the receiver computing device; receiving user input from an input device associated with the receiver computing device indicating user interaction with the GUI; sending the user input to the sender computing device; receiving from the sender computing device data indicating an updated state of the GUI generated by the sender computing device based on the user input; and displaying the updated state of the GUI on the display associated with the receiver computing device.

In this aspect, the local peer-to-peer wireless connection may be a WI-FI Direct connection.

In this aspect, the display may be a touch sensitive display and the input device is a touch sensor of the touch sensitive display configured to sense touch of a digit of a user or a stylus, and the user input is a touch input corresponding to the sensed touch of the digit of the user or an ink input corresponding to the sensed touch of the stylus.

In this aspect, the method may further include, prior to receiving the remotely executed GUI, at the sender computing device: presenting a device-discovery graphical user interface including a list of a plurality of identified receiver computing devices including the receiver computing device; receiving a selection input of the receiver computing device from an input device associated with the receiver device; and sending the GUI to the receiver computing device in response to receiving the selection input.

In this aspect, the plurality of identified receiver computing devices in the list may be identified via wireless connectivity.

In this aspect, the plurality of identified receiver computing devices in the list may be identified based on a physical or logical distance between the sender computing devices and the receiver computing devices.

In this aspect, the distances may be determined based on one or more of WI-FI communication, Bluetooth communication, near field communication (NFC), and subnet discovery.

In this aspect, a relative position of each of the plurality of identified receiver computing devices in the list may be determined based on a frequency of bi-directional communication sessions between the receiver computing devices and the sender computing device and the date and time of bi-directional communication sessions between the receiver computing devices and the sender computing device.

In this aspect, the list may include preview images associated with the plurality of identified receiver computing devices.

In this aspect, the method may further include at the sender computing device, hiding the device-discovery graphical user interface and displaying a connection bar in response to receiving the selection input of the receiver computing device from an input device associated with the receiver device.

In this aspect, the GUI may be displayed on the display within a window, the window associated with an application program locally executed on the receiver computing device.

According to another aspect, a receiver computing device is provided. The receiver computing device includes a processor configured to: establish a local bi-directional peer-to-peer wireless connection with a sender computing device co-located with the receiver computing device; receive from the sender computing device via the local bi-directional peer-to-peer wireless connection data for a graphical user interface (GUI) of a remotely executed application program executed on the sender computing device; display the GUI on an interactive touch sensitive display associated with the receiver computing device; receive user input from the interactive touch sensitive display indicating a user interaction with the GUI, the user input including at least one of touch input and ink input; send the user input to the sender computing device; receive from the sender computing device data indicating an updated state of the GUI generated by the sender computing device based on the user input; and display the updated state of the GUI on the interactive touch sensitive display.

In this aspect, the updated state may reflect a graphical change in the GUI based on a command executed via the application program remotely on the sender computing device.

In this aspect, the local bi-directional peer-to-peer wireless connection may be one of a Bluetooth connection and a WI-FI connection.

In this aspect, the interactive touch sensitive display may include a capacitive touch sensor configured to sense touch of a digit of a user or a stylus.

In this aspect, the processor may be further configured to receive audio data associated with the GUI from the sender computing device associated with the GUI and project the audio data via an audio device in the receiver computing device.

In this aspect, the receiver computing device display may be larger than a display associated with the sender computing device.

According to another aspect, a method for providing collaborative interaction between a receiver computing device and a sender computing device is provided. The method includes at a receiver application program executed by the receiver computing device, establishing a WI-FI or Bluetooth connection with a sender computing device via a sender application program executed by the sender computing device; receiving from the sender application program data for a graphical user interface (GUI) of a second application program executed on the sender computing device; displaying the GUI on an interactive touch sensitive display associated with the receiver computing device; receiving user input from an interactive touch sensitive display associated with the receiver computing device indicating user interaction with the displayed GUI, the user input including at least one of touch input and ink input; sending the user input to the sender application program; receiving from the sender application program data indicating an updated state of the GUI generated by the second application program based on the user input; and displaying the updated state of the GUI on the interactive touch sensitive display.

In this aspect, the updated state may reflect a graphical change in the GUI based on an action executed via the second application program remotely on the sender computing device.

In this aspect, the method may further include, prior to receiving the remotely executed GUI, at the sender computing device: presenting a device-discovery graphical user interface including a list of a plurality of identified receiver computing devices including the receiver computing device; receiving a selection input of the receiver computing device from an input device associated with the receiver device; and sending the GUI to the receiver computing device in response to receiving the selection input.

The invention claimed is:

1. A method for providing collaborative interaction between a receiver computing device and a sender computing device, the method comprising:
   at the receiver computing device, establishing a local peer-to-peer wireless connection with a sender computing device;
   receiving from the sender computing device, via the local peer-to-peer wireless connection, data for a graphical user interface (GUI) of a remotely executed application program that is executed on the sender computing device;
   displaying the GUI on a display associated with the receiver computing device;
   establishing another local peer-to-peer wireless connection with another sender computing device;
   receiving from the other sender computing device, via the other local peer-to-peer wireless connection, data for another GUI; and
   following reception of the other GUI from the other sender computing device, while the GUI is displayed on the display, programmatically inhibiting concurrent display of the other GUI on the display.

2. The method of claim 1, wherein the local peer-to-peer wireless connection is a WI-FI Direct connection.

3. The method of claim 1, further comprising, prior to receiving the remotely executed GUI, at the sender computing device:
   presenting a device-discovery graphical user interface including a list of a plurality of identified receiver computing devices including the receiver computing device;
   receiving a selection input of the receiver computing device from an input device associated with the sender computing device; and
   sending the GUI to the receiver computing device in response to receiving the selection input.

4. The method of claim 3, where the plurality of identified receiver computing devices in the list are identified via wireless connectivity.

5. The method of claim 3, where the plurality of identified receiver computing devices in the list are identified based on a physical or logical distance between the sender computing devices and the receiver computing devices.

6. The method of claim 5, where the distances are determined based on one or more of WI-FI communication, Bluetooth communication, near field communication (NFC), and subnet discovery.

7. The method of claim 3, where a relative position of each of the plurality of identified receiver computing devices in the list is determined based on a frequency of bi-directional communication sessions between the receiver computing devices and the sender computing device and the date and time of bi-directional communication sessions between the receiver computing devices and the sender computing device.

8. The method of claim 3, where the list includes preview images associated with the plurality of identified receiver computing devices.

9. The method of claim 3, further comprising at the sender computing device, hiding the device-discovery graphical user interface and displaying a connection bar in response to receiving the selection input of the receiver computing device from an input device associated with the receiver device.

10. The method of claim 1, where the GUI is displayed on the display within a window, the window associated with an application program locally executed on the receiver computing device.

11. A receiver computing device comprising:
   a processor configured to:
      establish a local bi-directional peer-to-peer wireless connection with a sender computing device co-located with the receiver computing device;
      receive from the sender computing device, via the local bi-directional peer-to-peer wireless, connection data for a graphical user interface (GUI) of a remotely executed application program executed on the sender computing device;
      display the GUI on an interactive touch sensitive display associated with the receiver computing device;
      establish another local peer-to-peer wireless connection with another sender computing device;
      receive from the other sender computing device, via the other local peer-to-peer wireless connection, data for another GUI;
      following reception of the other GUI from the other sender computing device, while the GUI is displayed on the display, programmatically inhibit concurrent display of the other GUI on the display.

12. The receiver computing device of claim 11, wherein the processor is further configured to:
   receive a plurality of concurrent user inputs from the interactive touch sensitive display indicating a user interaction with the GUI, wherein each user input of the plurality of concurrent user inputs is a touch input corresponding to a sensed touch of a digit of a user or an ink input corresponding to a sensed touch of a stylus;
   send the user inputs to the sender computing device;
   receive from the sender computing device data indicating an updated state of the GUI generated by the sender computing device based on the user inputs; and
   display the updated state of the GUI on the interactive touch sensitive display;
   where the updated state reflects a graphical change in the GUI based on a command executed via the application program remotely on the sender computing device.

13. The receiver computing device of claim 11, where the local bi-directional peer-to-peer wireless connection is one of a Bluetooth connection and a WI-FI connection.

14. The receiver computing device of claim 11, where the interactive touch sensitive display includes a capacitive touch sensor configured to sense touch of the digit of the user or the stylus.

15. The receiver computing device of claim 11, wherein the processor is further configured to receive audio data associated with the GUI from the sender computing device associated with the GUI and project the audio data via an audio device in the receiver computing device.

16. The receiver computing device of claim 11, where the receiver computing device display is larger than a display associated with the sender computing device.

17. A method for providing collaborative interaction between a receiver computing device and a sender computing device, the method comprising:
- at a receiver application program executed by the receiver computing device, establishing a WI-FI or Bluetooth connection with a sender computing device via a sender application program executed by the sender computing device;
- receiving, from the sender application program, data for a graphical user interface (GUI) of a second application program executed on the sender computing device;
- displaying the GUI on an interactive touch sensitive display associated with the receiver computing device;
- establishing another local peer-to-peer wireless connection with another sender computing device;
- receiving from the other sender computing device, via the other local peer-to-peer wireless connection, data for another GUI;
- following reception of the other GUI from the other sender computing device, while the GUI is displayed on the display, programmatically inhibiting concurrent display of the other GUI on the display;
- receiving a plurality of concurrent user inputs from an interactive touch sensitive display associated with the receiver computing device indicating user interaction with the displayed GUI, wherein each user input of the plurality of concurrent user inputs is a touch input corresponding to a sensed touch of a digit of a user or an ink input corresponding to a sensed touch of a stylus;
- sending the user inputs to the sender application program;
- receiving from the sender application program data indicating an updated state of the GUI generated by the second application program based on the user inputs; and
- displaying the updated state of the GUI on the interactive touch sensitive display.

18. The method of claim 17, where the updated state reflects a graphical change in the GUI based on an action executed via the second application program remotely on the sender computing device.

19. The method of claim 17, further comprising, prior to receiving the remotely executed GUI, at the sender computing device:
- presenting a device-discovery graphical user interface including a list of a plurality of identified receiver computing devices including the receiver computing device;
- receiving a selection input of the receiver computing device from an input device associated with the sender computing device; and
- sending the GUI to the receiver computing device in response to receiving the selection input.

20. The method of claim 1, wherein the display is a touch sensitive display and an input device is a touch sensor of the touch sensitive display configured to sense touch of a digit of a user or a stylus.

21. The method of claim 20, further comprising:
- receiving a user input from the input device associated with the receiver computing device indicating user interaction with the GUI, wherein the user input is a touch input corresponding to the sensed touch of the digit of the user or an ink input corresponding to the sensed touch of the stylus;
- sending the user input to the sender computing device;
- receiving from the sender computing device data indicating an updated state of the GUI generated by the sender computing device based on the user input; and
- displaying the updated state of the GUI on the display associated with the receiver computing device.

* * * * *